H. E. TOWNSEND.
AUTOMATIC SEALING MACHINE.
APPLICATION FILED JAN. 10, 1917.
1,402,809.
Patented Jan. 10, 1922.
6 SHEETS—SHEET 4.
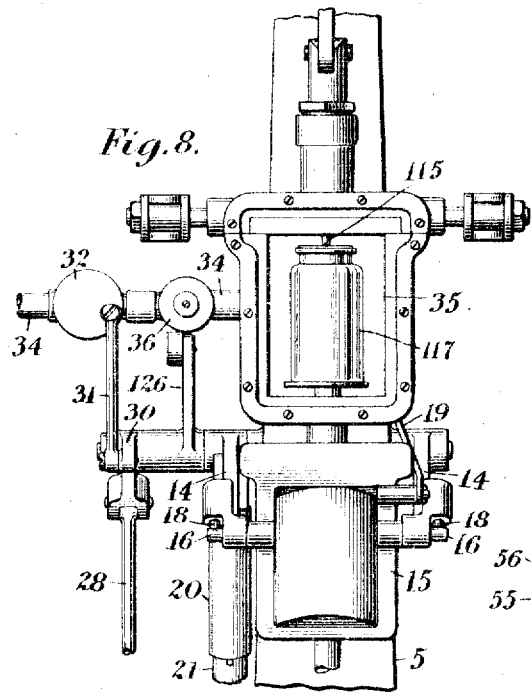
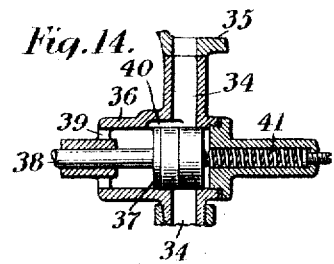
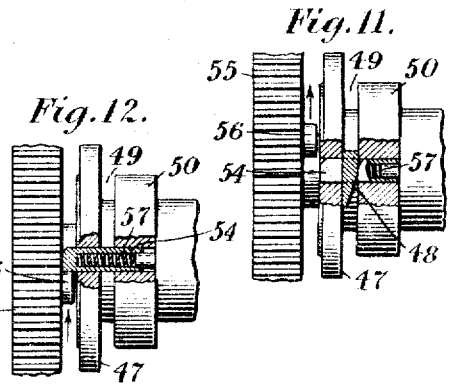
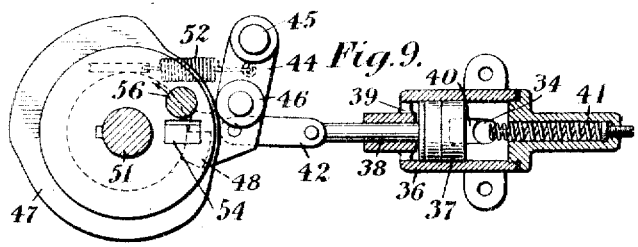
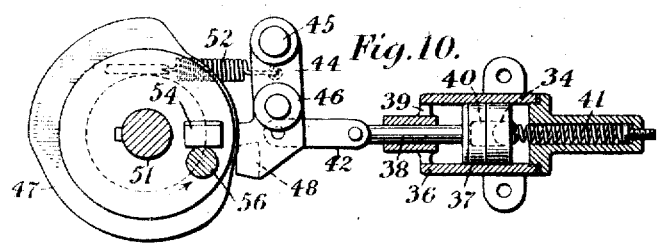
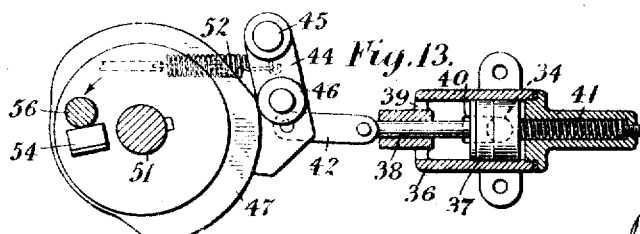
INVENTOR
Harry E Townsend
BY
Ramsey and Parmelee
ATTORNEYS H. E. TOWNSEND.
AUTOMATIC SEALING MACHINE.
APPLICATION FILED JAN. 10, 1917.
1,402,809.
Patented Jan. 10, 1922.
6 SHEETS—SHEET 5.
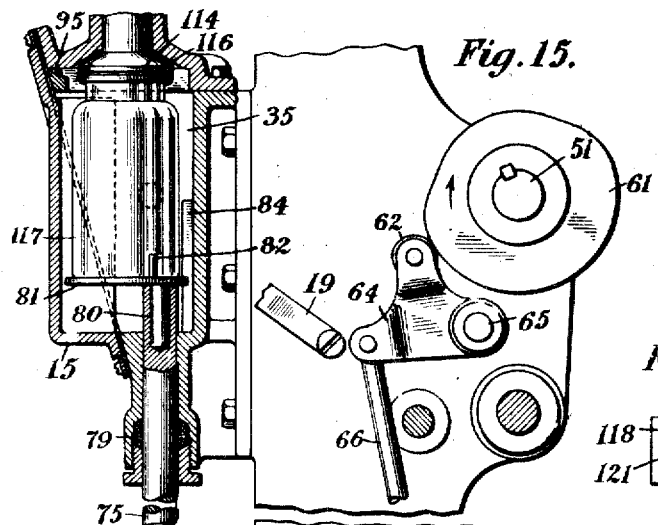
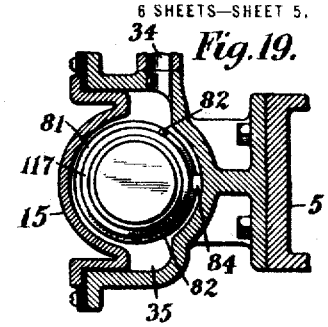
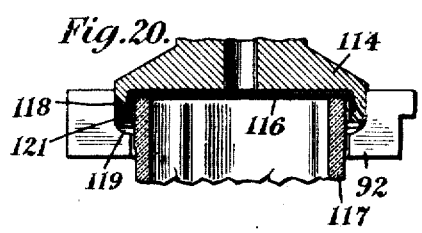
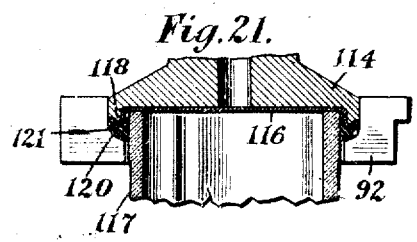
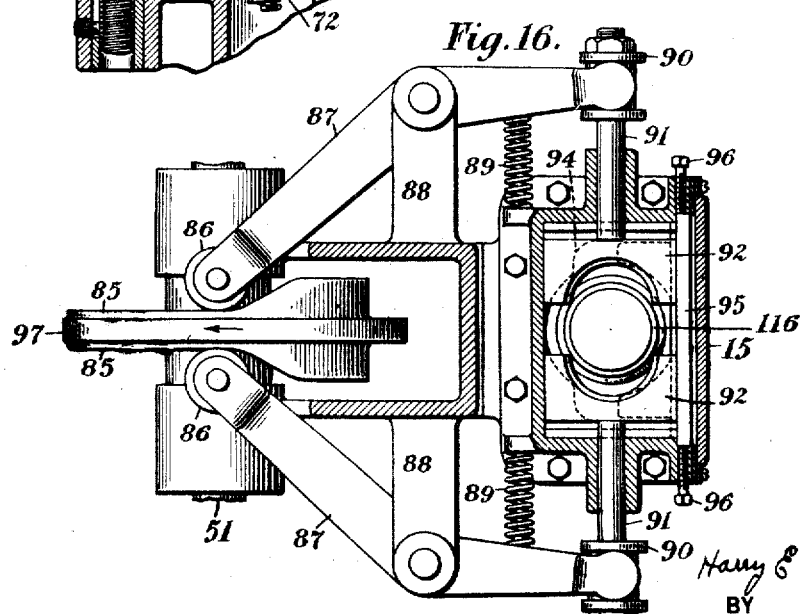
INVENTOR
Harry E Townsend
BY
Ramsey and Ramsey
ATTORNEYS

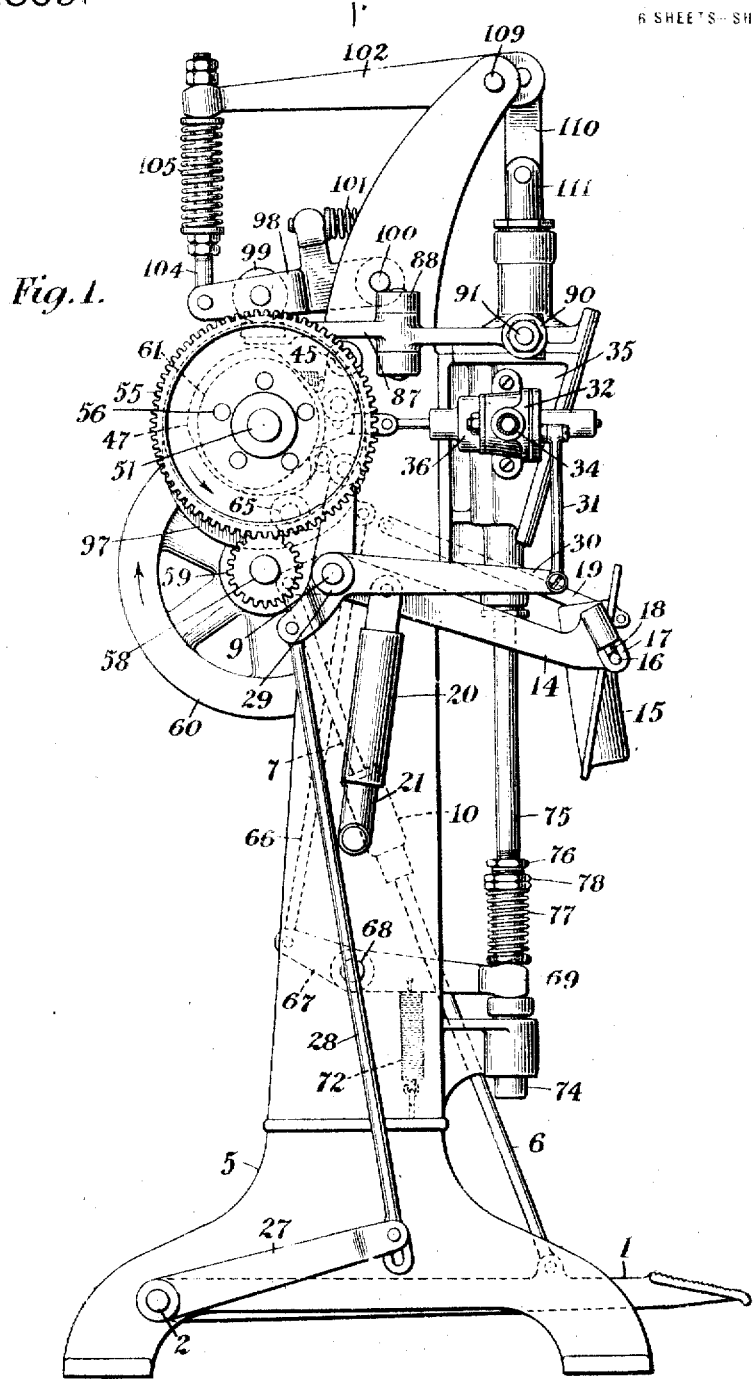

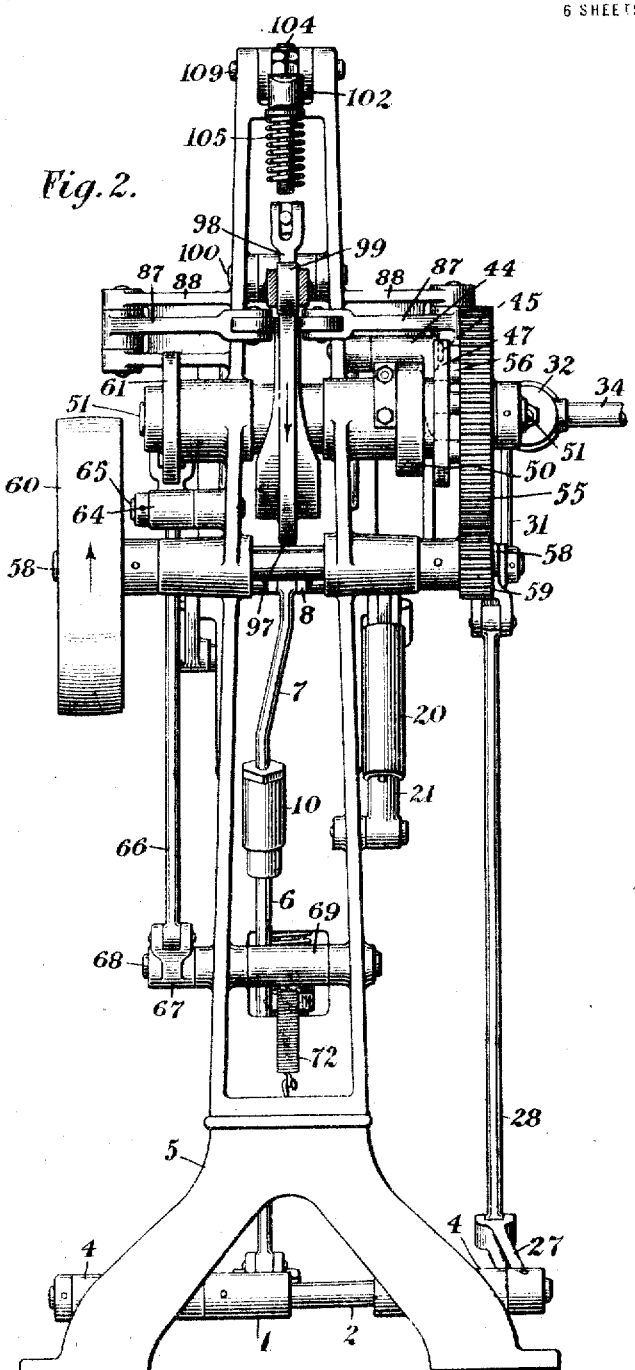

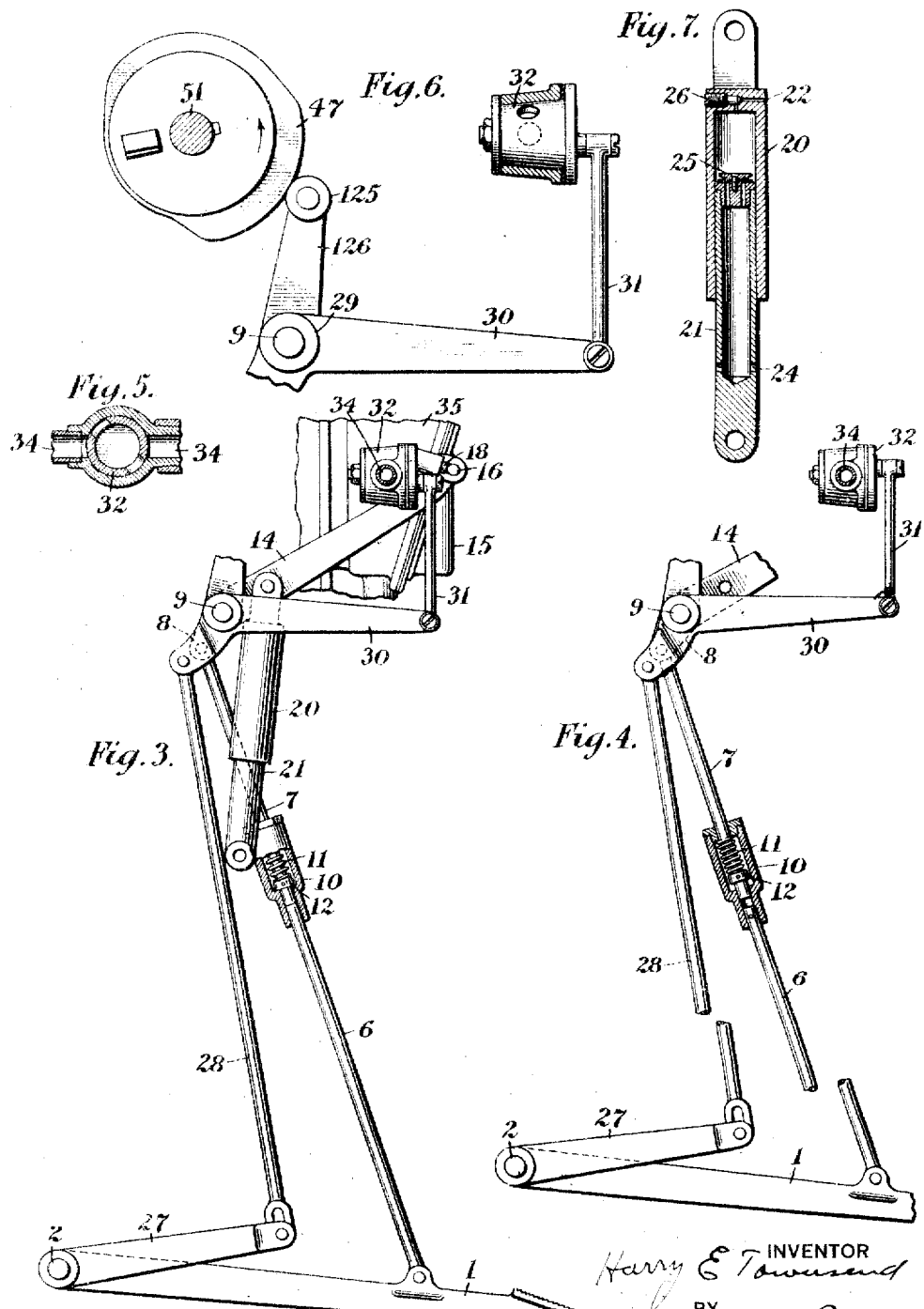

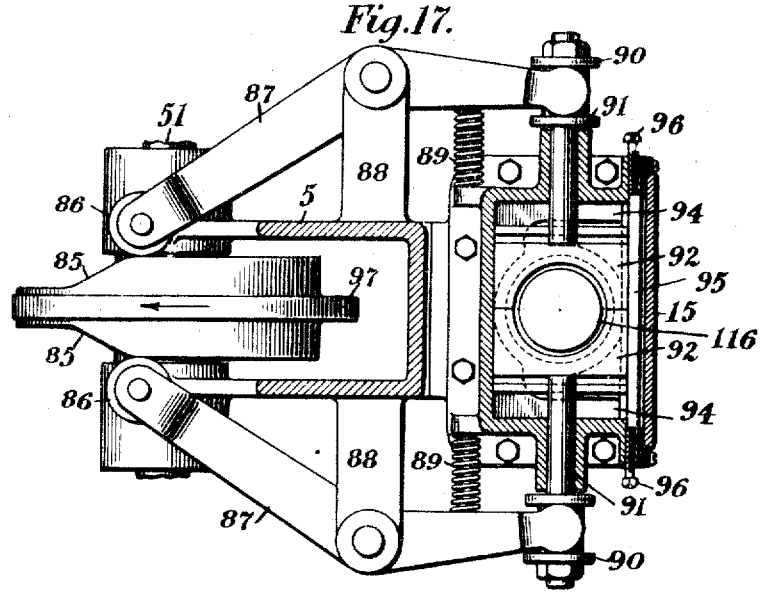
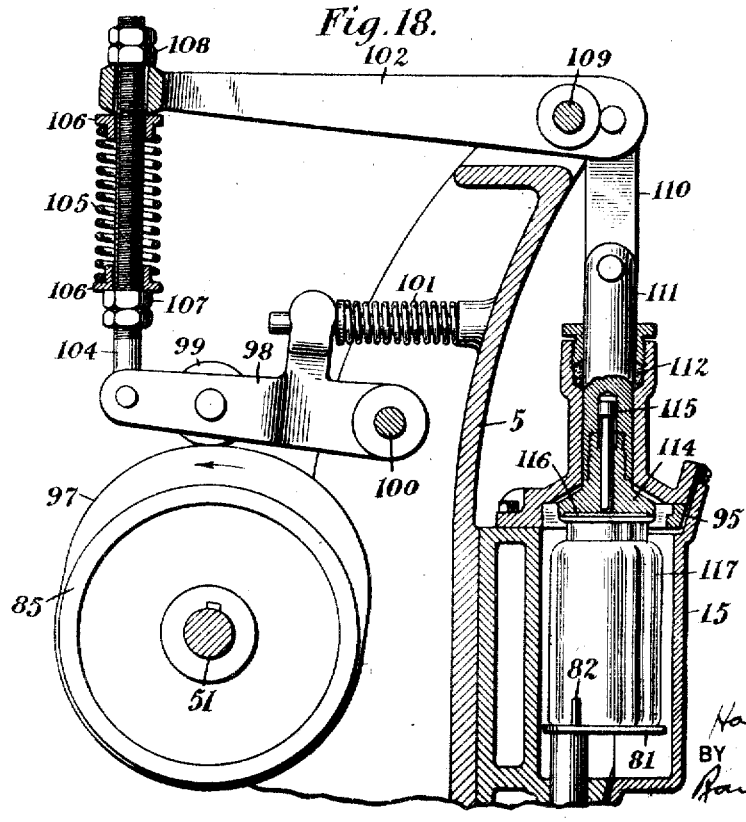

UNITED STATES PATENT OFFICE.

HARRY E. TOWNSEND, OF BROOKLYN, NEW YORK, ASSIGNOR TO THE ANCHOR CAP & CLOSURE CORPORATION, OF BROOKLYN, NEW YORK, A CORPORATION OF NEW YORK.

AUTOMATIC SEALING MACHINE.

1,402,809.   Specification of Letters Patent.   Patented Jan. 10, 1922.

Application filed January 10, 1917. Serial No. 141,549.

*To all whom it may concern:*

Be it known that I, HARRY E. TOWNSEND, a citizen of the United States, and a resident of the city of Brooklyn, in the county of Kings, State of New York, have invented certain new and useful Improvements in Automatic Sealing Machines, of which the following is a specification.

This invention relates broadly to sealing machines and more particularly to sealing machines wherein the package is sealed in a vacuum.

The principal object of the present invention is to provide a mechanism for sealing wherein the operating cycle of the machine is controlled pneumatically, and particularly by the vacuum within the sealing chamber.

Another object of the present invention is to provide an automatically operating machine wherein the mechanism is manually released and after a predetermined critical vacuum is formed in the sealing chamber the operating cycles of the machine are entirely automatic.

A further object of the present invention is a sealing machine wherein the operating cycles of the machine are not started until a predetermined vacuum has been established in the sealing chamber and after cycle is started the continuation thereof is automatic until the cycle is completed.

A still further and primary object of the present invention is to provide a sealing chamber constructed to be quickly and positively closed and opened by a door which moves bodily toward and away from said sealing chamber and wherein the movement of the door adjacent the sealing chamber is substantially a rectilinear movement.

A still further and also primary object of the present invention is to provide a substantially continuous sealing anvil to sustain sealing forces transmitted through the sealing chuck.

A still further object of the present invention is to provide a sealing anvil constructed to transmit sealing forces directly to the machine frame whereby the glass container is substantially relieved from sustaining direct sealing forces.

Other and further objects of the present invention will in part be obvious and will in part be pointed out hereinafter in the specification by reference to the accompanying drawings forming a part thereof, and wherein like characters are used to represent like parts throughout the several figures thereof.

Figure 1 is a view showing the machine in side elevation with the door open.

Figure 2 is a view showing the rear of the machine in elevation.

Figure 3 is a detail view illustrating part of the mechanism for closing the door to the vacuum chamber.

Figure 4 is a detail view illustrating part of the mechanism for operating the air control valve.

Figure 5 is a sectional view through the air valve.

Figure 6 is a detail view illustrating the power mechanism operating the air valve.

Figure 7 is a sectional view of the cushioning device for the door when opened.

Figure 8 is a detail view showing the vacum chamber with the door open.

Figure 9 illustrates the vacuum controlled mechanism for operating the clutch.

Figure 10 illustrates the relationship of parts when the clutch operating mechanism has been released.

Figure 11 is a detail view showing the relationship of parts of the clutch when the control mechanism is in the position shown in Figure 9.

Figure 12 illustrates the relation of the parts of the clutch mechanism when the parts are positioned as illustrated in Figure 10.

Figures 13 and 14 illustrate further positions of the controlling mechanism showing the position thereof wherein the main exhaust line is closed and the sealing or vacuum chamber is vented to the atmosphere.

Figure 15 is a detail view illustrating the mechanism for raising the package to bring the cap within the effective zone of operation of the sealing mechanism.

Figure 16 illustrates the mechanism for operating the sealing anvils, and showing the anvils in open position.

Figure 17 illustrates the sealing anvils as in closed position and adapted to sustain sealing pressure from the sealing chuck.

Figure 18 is a detail view illustrating the sealing operation.

Figure 19 is a detail sectional view taken on the horizontal plane through substantially the mid portion of the sealing chamber.

Figure 20 illustrates the relation of parts of the sealing mechanism at the beginning of the sealing operation.

Figure 21 illustrates the relation of the sealing mechanism at the end of the sealing operation.

Heretofore in the art of vacuum sealing machines it has been customary to construct the mechanism so that the vacuum was either controlled manually or was controlled mechanically by the cycles of operation of the machine. In the manually controlled devices it frequently happened that sufficient time was not permitted to elapse between the commencement of the air exhausting operation to form the vacuum and the sealing operation, so that where the sealing chucks were released too soon the sealing cap would be blown off by the air within the package, or too quick an operation resulted in an entirely inefficient vacuum being formed. In the machine controlled devices there is a possibility of the operation of the machine being speeded up so that sufficient time is not permitted for the exhaustion of the air and consequently the goods would be sealed under an inefficient vacuum. Furthermore, in machines of the type previously referred to no warning or provision is made against loss of vacuum by leakage, other than in some cases fitting machines with pressure gauges, so that a careless operator might not observe the gauge and would continue sealing goods where the leakage was so great as to substantially prevent the formation of proper and sufficient vacuums in the sealing chamber.

The present invention obviates the foregoing difficulties by providing a construction wherein the operating cycles of the machine, after a predetermined manual operation is performed, are controlled by the vacuum established in the sealing chamber. This may be effected by providing a construction wherein the cycle of operation is not commenced until the formation of a predetermined vacuum which establishes an operative connection between a suitable source of power and the operating elements for performing the seal. By this construction it will be seen that no operation is performed until a critical vacuum has been obtained in the sealing chamber,—by which I mean a reduction or exhaustion of gases from the chamber to the point where suitable and predetermined rarefaction has been obtained. This substantially insures that the goods are at all times sealed under the desired predetermined condition as to the vacuum.

Referring now to the drawings, and more particularly to Figures 1, 2, 3 and 4, it will be noted that the control treadle 1 is fixedly secured to a shaft 2 mounted in bearings 4 formed in the base of the machine frame 5. A link, comprising sections 6 and 7, is connected at one end with the control treadle 1 and at the other end with a lever 8 fixedly mounted on the door lifting arm shaft 9 which is likewise mounted upon suitable bearings in the machine frame 5. The section 6 of the control link carries a spring pocket 10 which is adapted to receive and guide the lower end of the section 7, and which lower end carries a coiled spring 11 that is adapted to be compressed between the collar 12 on the section 7 and the end of the spring pocket 10 when tension on the control link is greater than the strength of the coiled spring 11. The door lifting arm shaft 9 carries a pair of door supporting arms 14 between which the door 15 is supported by the door trunnions 16 resting in the guides 17 formed on the outer end of the door supporting arms 14. A pair of spring pressed plungers 18 normally retain the trunnions 16 in the bottom of the guides 17, as shown in Figure 1. These spring pressed plungers act at substantially right angles to the face of the door when a door is positioned before the vacuum chamber (Figure 3) and are slightly compressed when the chamber is closed and the vacuum formed therein, so that when the vacuum is released the plungers assist in breaking the seal between the door 15 and the walls of the chamber. It will be noted that the face of the door is inclined upwardly and that the door is provided with a suitable recess to fit the package (Figures 1, 3, 8, 15 and 19). This inclination of the door face is of great importance since it enables the door to quickly separate from the face of the chamber wall and automatically drop away from the seat on the sealing chamber when the vacuum in the sealing chamber is broken as will be hereinafter explained. A guide link 19 may be provided to assist in preventing oscillation of the door during opening and closing movements.

Since the door 15 is relatively heavy and mounted on the outer ends of the arms 14 the weight of the door drops away from the face of the vacuum chamber with considerable force and a check is provided to receive the shock from such opening movement.

This check, as illustrated in Figures 1, 2, 3 and 7, comprises a pair of telescoping members 20 and 21 that are provided with suitable air vents, as at 22 and 24, and a valve, as at 25, whereby air is admitted within the member 20 when the parts are extended and is trapped therein when the parts are contracted, with the exception of escape through the vent 22 which is adjustable controlled through means of the needle valve 26, so that this device comprises a pneumatic cushion against which the door is returned by gravity when the vacuum is broken.

The shaft 2 carrying the control treadle 1 also carries a lever arm 27 which is connected by means of the slotted link rod 28 with a three-arm bell-crank lever 29. This bell-crank lever 29 is mounted to rotate upon the door lifting arm shaft 9 and includes an arm 30 which is connected by means of a link 31 with a rotary valve 32 in the air exhaust line 34 which line is connected with a suitable exhaust or vacuum pump (not shown). The rotary valve 32 is normally set in closed position (Figure 5) when the machine is not in operation. The exhaust line 34 is operatively connected with the sealing chamber 35, (Figures 8, 14, 15 and 19). The front face of the sealing chamber is inclined downwardly and is provided with a suitable air-tight packing joint to co-operate with the door 15. After the treadle 1 has been actuated to close the door 15 further pressure on the treadle compresses the spring 11 in the control lever, draws the pin in the lever 27 to the bottom of the slot in the link 28, and operates the connections to open the exhaust line valve 32. A short cylinder 36 (Figures 1, 8, 9, 10, 13 and 14) is connected in the exhaust air line 34 between the rotary valve 32 and the sealing chamber 35. A piston 37 is mounted to reciprocate within this cylinder and is secured to a short piston rod 38. The piston 37 is of a sufficient length and is so positioned that it acts as a piston valve to cut off or close the air exhaust line 34 when the piston is in the position shown in Figure 14. The forward end of the cylinder 36 is vented to the atmosphere, as at 39, and the air exhaust line 34 is by-passed, as at 40, to the conduit leading to the sealing chamber, so that when the piston 37 closes the exhaust line it simultaneously or immediately thereafter vents the sealing chamber to the atmosphere. An adjustable spring 41 is provided to assist in regulating the action of the piston to limit its movement to predetermined conditions. The forward end of the piston rod 38 is connected by means of the link 42 with a clutch control lever 44 which is pivoted, as at 45, to the main frame and carries a roller 46 adapted to co-operate with a rotary cam 47. The clutch control lever is provided on its inner end with a dog face 48 which is constructed to normally lie within the groove 49 of the driven member 50 carried by the main shaft 51. A spring 52 normally holds the dog face within the said groove 49 in which position the dog engages a notch in the clutch plunger 54 which is normally spring pressed toward the drive gear 55. As soon as the air valve 32 is manually opened (which cannot be done before closing the door 15) the air is exhausted, through the valve from the sealing chamber 35 and back of the piston 37, so that atmospheric pressure moves the piston rearwardly, thus withdrawing the dog 48 and releasing the plunger 54. The drive gear 55, which rotates continuously, carries a pin or projection 56 which co-operates with the clutch plunger 54 (Figures 10 and 12) when the dog 48 is withdrawn to permit the plunger to be driven outwardly by the spring 57 to engage the pin 56 and constitute a positive drive between the drive gear 55 and the driven member 50.

The drive gear 55 is positively driven by the power shaft 58 which carries the reducing gear 59 and the belt fly wheel 60. As soon as the clutch plunger 54 engages the pin 56 the main shaft 51 commences rotation, the cam 47 operates first on roller 125 to close the air valve 32, thus conserving the energy necessary to produce the required vacuum, then on roller 46 to close exhaust conduit 34 and then to vent the chamber. Meanwhile the lifter or cam 61 (Figure 15) operating upon the roller 62 carried by the triangular lever 64 pivoted on the main frame, as at 65, thrusts upon the link 66 which is connected to the arm 67 on the lifter shaft 68 that carries the forward lifter arm 69 and lifts the forward end of this arm. This lifter arm is bifurcated at the front end to engage the lifter stand between the collars 70 and 71. A strong coiled spring 72 connected to the forward lifter arm 69 retains the roller 62 in proper contact with the lifter cam 61 and also serves to assist in lowering the lifter stand. The lifter stand comprises a tubular member 74 which is screw threaded at its upper end to receive and permit the adjustment of the lifter or table rod 75 which is locked in adjusted positions by means of the lock nut 76. This tubular member 74 carries a coiled spring 77 which rests at one end against a pair of lock nuts 78 and at the other end against the collar 70, which, as previously stated, rests against the bifurcated end of the lifter arm 69 and is free to slide upon the tubular member 74. The table rod 75 extends into the sealing chamber 35 and is preferably packed with a suitable gasket, as at 79.

The upper end of the table rod is recessed and is adapted to receive the carrying pin 80 of a package supporting table 81. The pin 80 is not locked within the table rod so that various types of tables may be used in accordance with the character of the package being sealed. The table herein shown comprises a substantially flat disk provided on the rear portion with a pair of guide pins 82 adapted to contact with the sides of a predetermined package to position the package on the table, and the chamber is also provided with the guide bar 84 which prevents rotation of the table upon the carrying pin 80.

Immediately after the foregoing mentioned parts have operated to lift the table and connected parts, the side cams 85 (Figures 16 and 17) operating upon the rollers 86 move the lever arms 87 which are pivoted upon brackets 88 in such manner as to separate the rollers and bring the outer ends of the lever arms nearer together against the action of the springs 89. The outer ends of the lever arms 87 are bifurcated to enclose flanged wear collars 90 that are carried by the short shafts 91 which are fixedly connected to the bead forming anvil jaws 92. These anvil jaws 92 are mounted for reciprocation within the upper part of the sealing chamber 35 and are guided by a shelf 94 (Figure 17) formed in the upper part of the sealing chamber and by a guide bar 95 (Figures 15, 16 and 17) which is removably mounted in the upper portion of the sealing chamber 35. This guide bar is positioned by and may also be adjusted by the stub bolts 96. (Figures 16 and 17.)

When the bead forming anvil jaws are closed, as shown in Figure 17, the sealing cam 97 becomes active to lift the second class lever 98 which carries the anti-friction roller 99 and is suitably pivoted to the machine frame, as at 100. The spring 101 normally maintains the roller 99 in contact with the sealing cam 97 and maintains the parts under proper tension. The outer end of the lever 98 carries an adjustable spring connector which transmits power to the sealing lever 102. This spring connector is adjustable to transmit proper sealing pressure and comprises a threaded rod 104 carrying the spring 105 which rests against the collars 106 that are loosely mounted on the threaded rod 104. The lower collar is sustained upon a pair of adjusting lock nuts 107 and the upper collar rests directly against the end of the sealing lever 102, while the upper end of the threaded rod 104 carries a second pair of adjusting lock nuts 108. The sealing lever 102 is pivoted, as at 109, in the extreme upper portion of the main frame and is connected through the link 110 with the chuck carrying plunger 111 which enters the sealing chamber through a suitable gland or packing 112. This chuck carrying plunger is threaded to receive the forming chuck 114 and also carries a gravity operated pin 115 which rests upon the closure cap 116 prior to the sealing operation and during the time while the air is being exhausted from the sealing chamber 35 and from the package 117, in order to prevent the sealing cap from being entirely displaced from position over the neck of the container.

As the sealing chuck descends (Figures 20 and 21) the bead 118 on the forming chuck engages the upper edge of the closure cap and forces this edge of the closure cap into the forming ring 119 of the anvil jaws 92, thereby compressing the edge of the closure cap and distorting the same to form the sealing bead 120 which forces the gasket 121 tightly against the walls of the container 117, thus forming a completed package.

In the operation of the machine, after a suitable package, as for example the one designated by the numeral 117, with the closure cap loosely seated on the mouth thereof, is set on the table 81, the operator depresses the treadle 1 which through the connecting links raises the door 15 in front of the sealing chamber 35, as shown in Figure 15. Further pressure upon the treadle 1 compresses the spring 11, draws the pivot on the end of the lever 27 to the bottom of the slot in the link 28, thereby operating the arm 30 through connected parts to rotate the valve 32. When this valve is opened the exhaust or vacuum maintained within the air exhaust line 34 becomes effective to exhaust the air from the sealing chamber 35 and also to draw the door 15 tightly against the inclined face of the sealing chamber 35, thus slightly compressing the springs in the spring plungers 18. When a predetermined vacuum has been attained in that portion of the conduit beyond the valve 32, and including the sealing chamber 35, the air pressure acting upon the forward part of the piston 37 drives this piston inwardly and removes the dog 48 from engagement with the clutch plunger 54. As soon as the clutch plunger 54 is released the spring drives this plunger forward into the path of the pin or projection 56 on the continuously rotating drive gear 55 whereby the main shaft 51 is now positively rotated. The rotation of the main shaft causes a cam 61, operating through connected parts, to lift the table rod 75 and raise the package so that the closure cap is in the zone of effective operations of the sealing mechanism. The cams 85 are now effective, through connected parts, to close the bead forming anvil jaws 92 so that the sealing cap is substantially encompassed by these jaws. The sealing cam 97, through the spring connector and co-operating elements, imparts movement and pressure to the sealing chuck 114, which through co-operation with the anvil distorts the edge of the sealing cap to form a bead whereby a suitable seal is effected. The turning of the main shaft 51 brings the cam 47 into operation on the roller 125 of the arm 126, which is fixedly connected with the arm 30 controlling the air valve 32, thereby positively closing the air valve. Then cam 47 normally comes into operation on roller 46 to drive rearwardly the piston 37 against the influence of spring 41, to close the exhaust conduit 34 and then to vent the sealing chamber to atmosphere. (See Figures 13 and 14.) As soon as the vacuum in the chamber 35 is destroyed the door 15 drops directly away from the contacting wall of the chamber 35 to its lowered position as shown in Figure 1. The piston 37 is arranged so that under certain conditions it may act as a valve to close the exhaust conduit 34 independently of cam 47. Normally, when the piston 37 is moved rearwardly by air pressure, its movement is arrested by the spring 41 in the position illustrated in Figure 10, leaving the exhaust conduit 34 still in communication with the sealing chamber. This permits a constant vacuum being drawn on the sealing chamber during the sealing operation. In the event of some abnormal operation, however, such as too sudden or excessive drawing of the vacuum, the air pressure may be rendered effective to move the piston 37 to a position to close the conduit 34, as illustrated in Figure 14, depending, of course, upon the adjustment of spring 41. Upon further rotation of shaft 51, cam 47, advancing from its action on the roller 46, permits lever 44 to resume its normal position, in which dog 48 is moved into groove 49 wherein it is effective to cause withdrawal of the spring pressed plunger 54 from engagement with the projection or pin 56 on the drive wheel 55, thus completing one cycle of operations of the machine.

Realizing that my invention may be carried out by embodiments other than the specific structure herein disclosed, I desire that such disclosure is to be understood as illustrative and not to be taken in the limiting sense.

Having thus described my invention what I claim is:

1. A sealing mechanism comprising, in combination, a power shaft, a double acting cam mounted upon said power shaft, a pair of arms co-operating with said cam, a pair of segmental anvils operatively connected with said arms whereby the rotation of said cam acting through said power shaft operates said arms to close said segments thereby forming a complete operative anvil, another cam, a sealing chuck, devices operatively connecting said last mentioned cam with said sealing chuck, said devices including an adjustable resilient connection whereby forces of a predetermined magnitude may be transmitted from the said last mentioned cam to the said sealing chuck, said cams being timed so that the sealing chuck becomes operative after the anvil segments have been moved to form substantially a complete anvil.

2. In a sealing machine, the combination of a sealing chamber having a front opening therein, suitable packing material surrounding said opening and constructed to co-operate in forming an air-tight joint, a door adapted to co-operate with said packing and close said opening, the walls of said opening and the face of said door being constructed in such manner that the center of mass of the door is beneath the said walls whereby the said door will drop away by gravity from the said walls when the vacuum in said chamber is released, and means for guiding said door in its movement to and from said opening.

3. In a sealing machine, in combination, a sealing chamber having the front side open, a table within said sealing chamber adapted to support a suitable package to be sealed, a door for said sealing chamber, said door being provided with an inclined face constructed to co-operate with the sealing chamber and having a vertical recess adapted to accommodate a package within said sealing chamber, and means for operating said door.

4. In a sealing machine, a chamber having an open front side provided with a downwardly inclined wall adjacent the mouth thereof, a door having an upwardly inclined face constructed to co-operate with said downwardly inclined wall, and means to guide said door to and from said inclined wall to close and open said chamber, said means being constructed to guide said door in substantially a vertical direction during the opening and closing movements.

5. In a sealing machine, in combination, a package sealing chamber having the open front side thereof provided with a downwardly inclined wall, a door adapted to fit over said downwardly inclined wall to close said chamber, means to move said door upwardly to close said chamber, means operative to cause said door to be retained in position over said chamber while the sealing operation is taking place, devices for causing said door to be released when the sealing operations are finished and to permit said door to drop to inoperative position under the influence of gravity.

6. In a sealing machine, the combination of a package receiving chamber having one side thereof open, the walls bounding said open side forming an inclined sealing surface, a door adapted to be raised up beneath and to engage said surface to close said chamber, means for causing said door to be retained against said walls during a predetermined cycle of operations of the machine, means for causing said door to be released, and devices to guide said door in its opening and closing movements whereby upon being released the said door will drop to open position under the influence of gravity.

7. In an automatic sealing machine, the combination of a continuously rotating drive shaft, a sealing chamber, sealing devices operating within said sealing chamber, a conduit in which a suitable vacuum is maintained, said conduit leading to said sealing chamber, a cylinder operatively connected with said conduit, a piston constructed to reciprocate within said cylinder, a clutch connected with said piston and adapted to be released by the operation of said piston whereby said continuously rotating shaft is operatively connected with the sealing mechanism to effect a suitable seal, means for moving said piston to close the said conduit, and means whereby said vacuum chamber is vented to atmosphere after said conduit has been closed.

8. In a sealing machine, in combination, a sealing chamber, means for supporting a package in the chamber, means for exhausting the chamber, a door separate from the chamber for closing the same, a pivoted arm carrying the door, means for actuating the arm to move the door to the chamber, and a connection between the arm and the door whereby the latter has movement relative to the chamber independently of the arm.

9. In a sealing machine, in combination, a sealing chamber, a movable door forming a closure therefore, means for exhausting the chamber, a support operable to move the door to and from the chamber, and a connection between said support and said door whereby the latter has movement relative to the chamber independently of the support.

10. In a vacuum sealing machine, in combination, a chamber, sealing mechanism for sealing a package therein, a motive source for actuating said sealing mechanism, a clutch for controlling the effectiveness of the motive source upon the sealing mechanism, exhausting means for decreasing the pressure in the chamber, a movable member responsive to pressure changes in the chamber and operable to close the chamber from the exhausting means, and an operative connection between said member and the clutch.

11. In a vacuum sealing machine, in combination, a chamber, means for sealing a package in said chamber, means for exhausting the chamber, a motive source for operating the sealing means, a device operatively responsive to pressure changes in the chamber for rendering the motive source effective upon the sealing means, and means for operating said device to vent the chamber.

12. In a package closing machine, in combination, a chamber, means for drawing a vacuum in said chamber, operating mechanism associated with the chamber, a clutch control member associated with said operating mechanism, and a member responsive to pressure changes in the chamber for operating the clutch control member, said operating mechanism including means effective on the clutch control member to operate the pressure responsive member to vent the chamber.

13. In an automatic sealing machine, the combination of a sealing chamber, a conduit in which a suitable vacuum is adapted to be maintained, said conduit being operably connected with said sealing chamber, a continuously rotating drive shaft, sealing mechanism in the sealing chamber, and means comprising a device responsive to pressure in the sealing chamber for accomplishing the connection of said continuously rotating drive shaft with the sealing mechanism, said device being operable to vent the sealing chamber to atmosphere.

HARRY E. TOWNSEND.